United States Patent [19]
Roberts

[11] 4,177,147
[45] Dec. 4, 1979

[54] BIOLOGICAL TREATING SYSTEMS

[75] Inventor: Robert L. Roberts, Boothwyn, Pa.

[73] Assignee: Roberts Filter Manufacturing Company, Darby, Pa.

[21] Appl. No.: 887,952

[22] Filed: Mar. 20, 1978

[51] Int. Cl.² ............................................. C02C 1/04
[52] U.S. Cl. ..................................... 210/151; 210/322
[58] Field of Search ............... 210/150, 151, 328, 329, 210/322

[56] References Cited

U.S. PATENT DOCUMENTS

| | | | |
|---|---|---|---|
| 2,326,484 | 8/1943 | Moreton | 210/329 |
| 3,827,559 | 8/1974 | Gass et al. | 210/150 |
| 3,837,492 | 9/1974 | Di Bello | 210/150 |
| 3,847,811 | 11/1974 | Stengelin | 210/150 |
| 3,894,953 | 7/1975 | Torpey | 210/151 |
| 3,932,273 | 1/1976 | Torpey | 210/151 X |
| 4,026,802 | 5/1977 | Akae | 210/151 |

*Primary Examiner*—John Adee

[57] ABSTRACT

Biological treating systems include a treating tank for receiving wastewater to be treated, and a wastewater contacting unit mounted for reciprocating movement into and out of wastewater retained within the tank. Movement of the unit out of the wastewater exposes it to oxygen that is needed to maintain an aerobic environment for biolgical slimes, and movement of the unit into the wastewater permits these slimes to feed upon and metabolize pollutants therein. Preferably the systems include a plurality of wastewater contacting units positioned in pairs on opposite sides of axles and connected thereto. These axles are mounted for reciprocating movement, and a drive mechanism is provided to reciprocate the axles and the connected pairs of contacting units.

15 Claims, 7 Drawing Figures

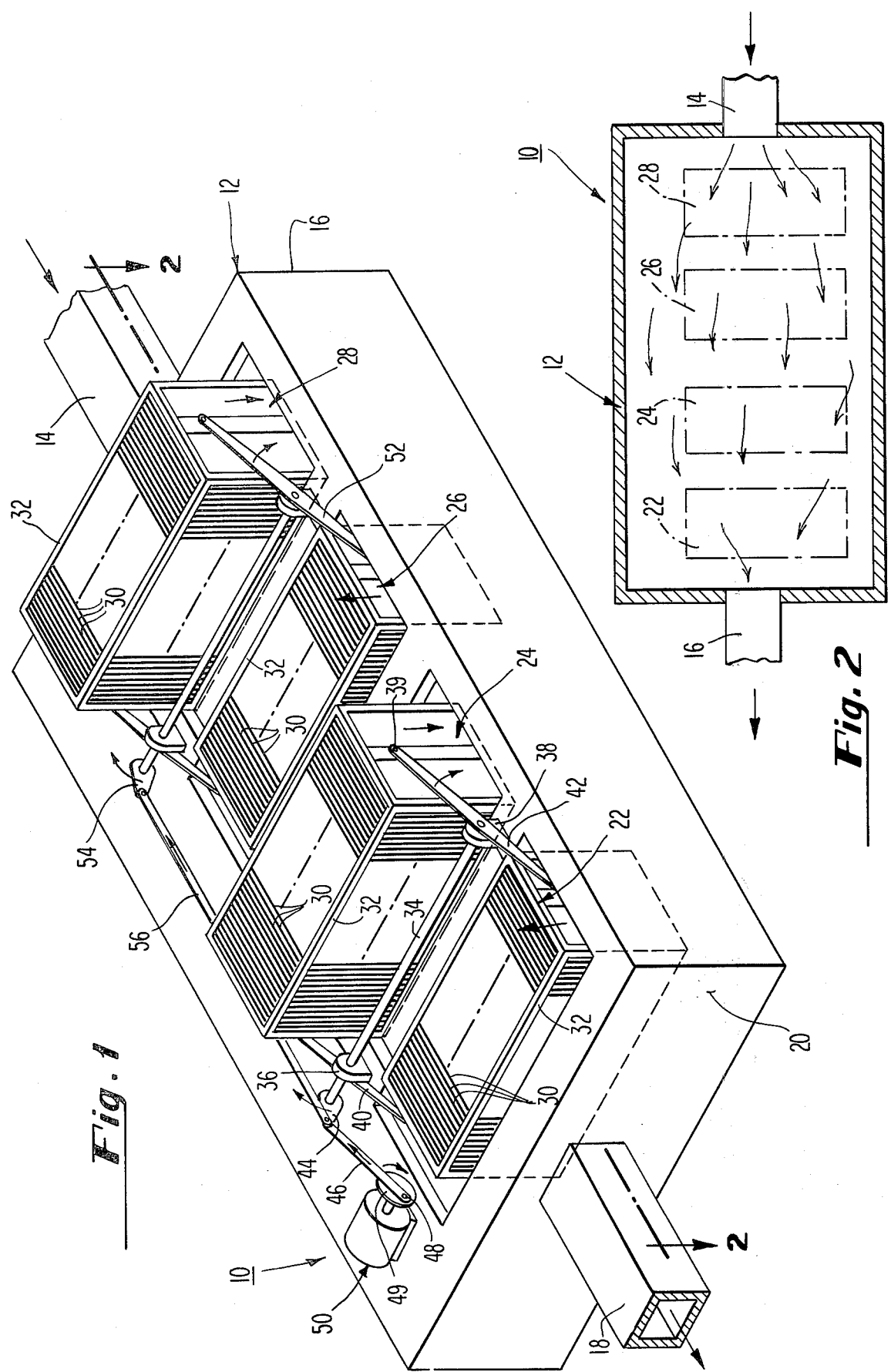

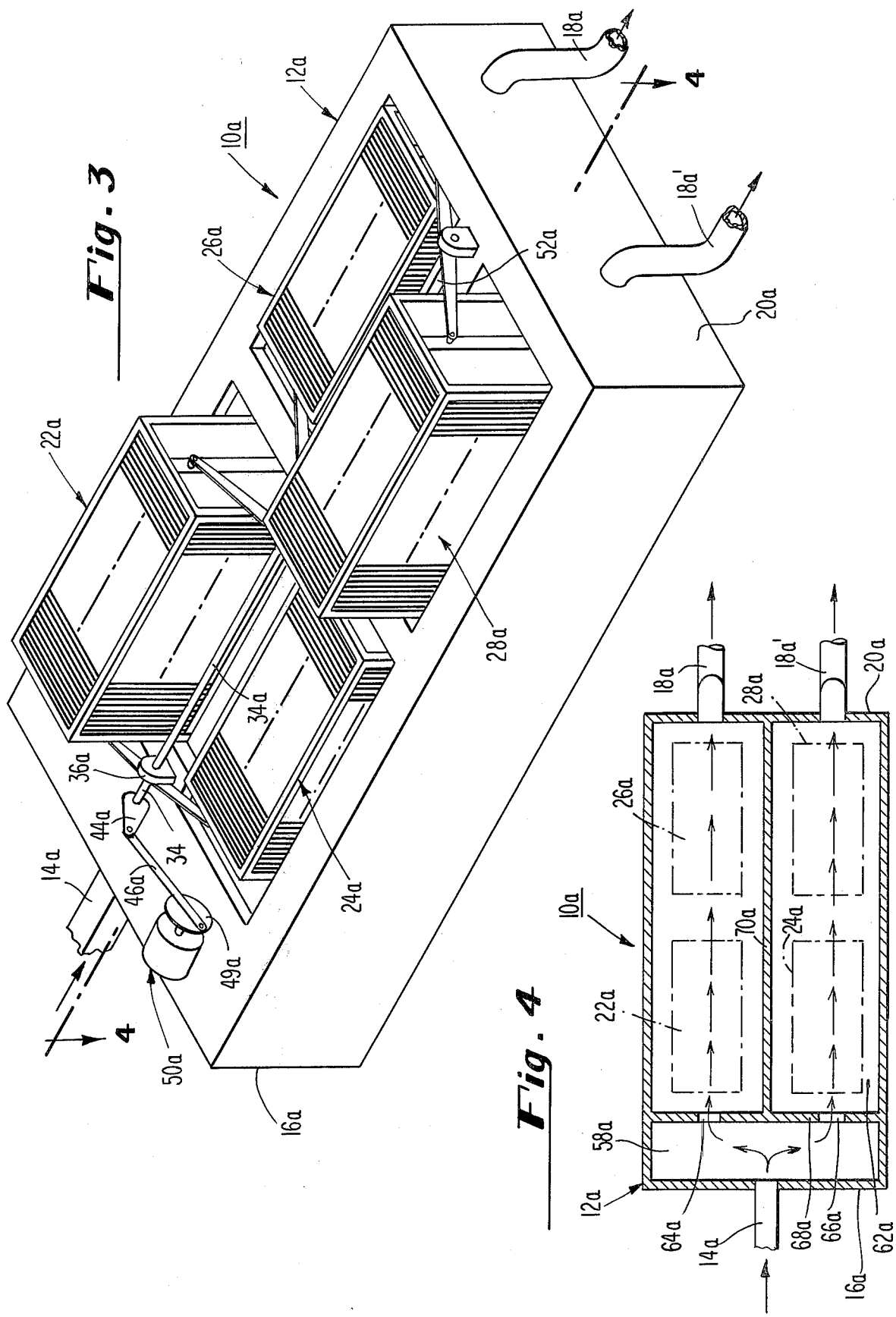

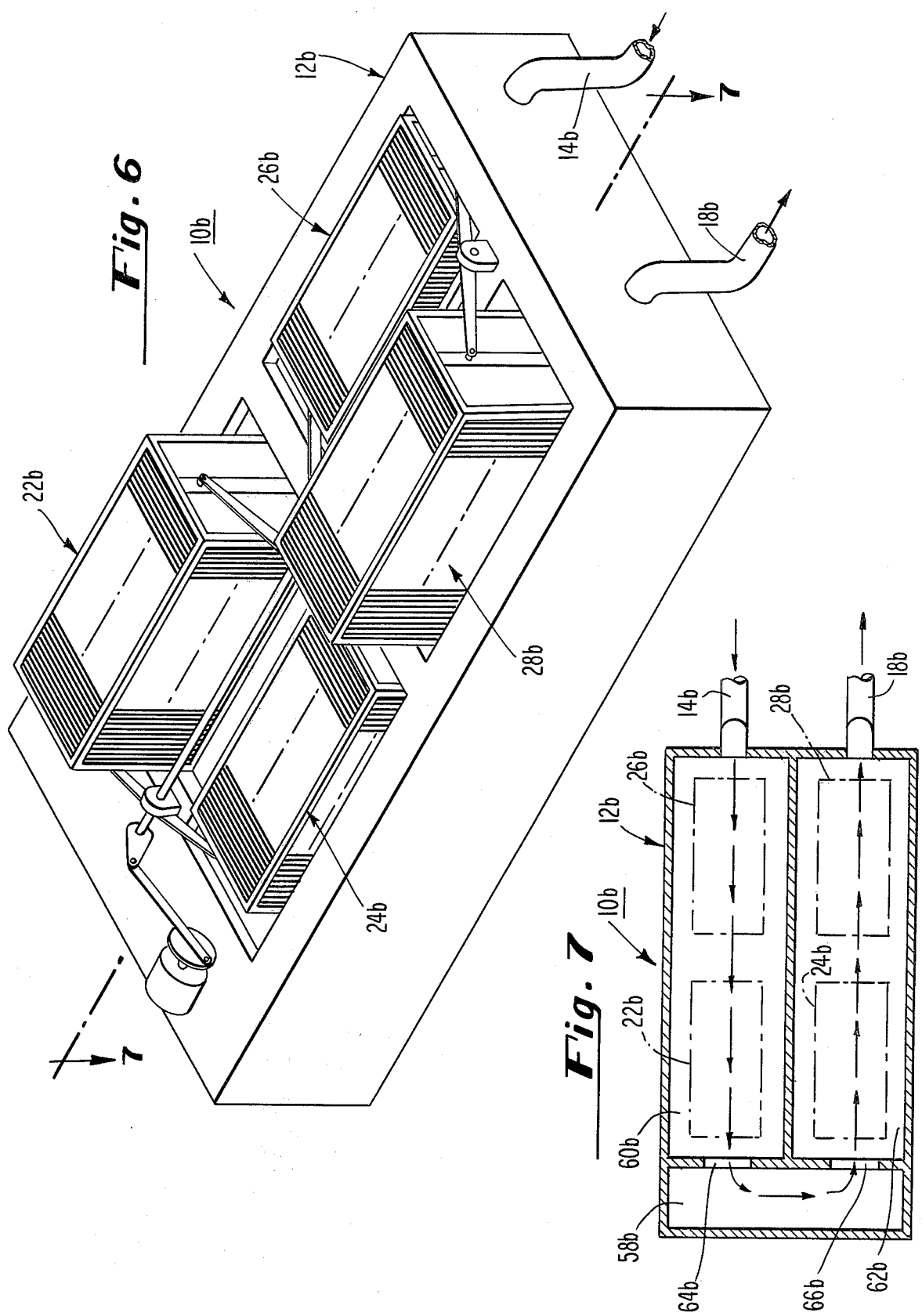

BIOLOGICAL TREATING SYSTEMS

BACKGROUND OF THE INVENTION

This invention relates generally to the filtering art, and more specifically to biological treating systems for aerobically treating wastewater.

Biological treating systems, particularly for the secondary treatment of domestic and/or industrial wastewater, are commonly employed in wastewater treatment installations. These systems include surfaces upon which aerobic biological slimes are grown, and these slimes assimilate, as a food source, the pollutants in the wastewater.

One of the better known biological systems for aerobically treating wastewater employs moving biological contactors in the form of rotating discs, and is manufactured by Autotrol Corporation of Milwaukee, Wis. Autotrol holds numerous patents relating to rotating biological contactors and to various different types of wastewater treatment facilities in which such contactors may allegedly be utilized. U.S. Pat. Nos. 3,827,559 (Gass et al); 3,894,953 (Torpey) and 3,932,273 (Torpey et al) are but a few of the patents owned by Autotrol that relate to the use of rotating biological contactors for aerobically treating wastewater.

In the Autotrol systems the aerobic treatment of wastewater is carried out by connecting the contactors to centrally disposed rotatable axles, and rotating the axles with the contactors in a partially submerged condition within the wastewater. In this manner the biological slimes are exposed to oxygen on the portions of the rotating contactors that are not submerged in the wastewater, and these slimes will then feed upon the pollutants in the wastewater when they are submerged therein. The range of shapes and sizes of rotating contactors that can be satisfactorily utilized in the aerobic treatment of wastewater is limited by the fact that such contactors have to be designed so that they are capable of continually rotating in a partially submerged condition within the wastewater while being rotatably supported on a centrally disposed axle; preferably with the axle positioned above the wastewater.

A different type of system employing moving filter elements is disclosed in U.S. Pat. No. 4,026,802, issued to Akae. In this system modular filters of the type that can provide biological treatment to wastewater are connected together in a closed loop, and are continuously rotated in a single direction through the wastewater to be treated. In forming this closed loop arrangement it is necessary to mount components, such as guide rolls, directly within the filter tank beneath the upper surface of the wastewater. If these submerged components malfunction it is necessary to completely stop the operation of the system and drain the chamber to effect repair. Moreover, since all of the modules are connected together in a continuous, closed loop, it is necessary to stop the rotational motion of the entire loop in the event that repair or replacement of either the chain drive or a particular module is necessary. Both of these latter conditions can result in undesirable downtime in the treatment operation.

SUMMARY OF THE INVENTION

The biological treating systems of this invention may be employed in many different environments wherein aerobic treatment of liquids is desired, and most preferably may be utilized in connection with the treatment of domestic or industrial wastewater. Specifically the biological systems of this invention may be employed in existing treatment facilities, or in entirely new facilities, depending upon needs or desires.

In the systems of this invention one or more biological contactor units are mounted for reciprocating movement into and out of the wastewater to be treated. To the best of applicant's knowledge the use of reciprocating biological contactor units has never been employed or suggested for use in aerobic biological treatment facilities. This reciprocating action can be employed to achieve desirable benefits, as will be described hereinafter.

Reference throughout this application, including the claims, to moving a biological contactor unit "into" the wastewater is intended to cover either completely or partially submerging the contactor unit in said wastewater. Most preferably movement of a contactor unit into the wastewater should be carried out so that, in the most submerged condition, at least 50% of its surface area is beneath the surface of the wastewater. In a like manner, reference to moving a contactor unit "out of" the wastewater is intended to include either completely or partially removing the unit from said wastewater. Most preferably movement of a contactor unit out of the wastewater should be carried out so that at least 50% of its surface area is exposed to the atmosphere.

In many instances it may be desirable to reciprocate the biological contactor units without completely removing them from the wastewater to eliminate the need for overcoming surface tension effects as the biologicl contactor units are being reciprocated.

A biological treating system of this invention includes: a treating tank for receiving wastewater to be treated; a wastewater contacting unit mounted for reciprocating movement into and out of wastewater received in the tank; and drive means for reciprocating the unit into and out of the wastewater to treat the wastewater and to encourage the growth of aerobic biological slimes on the unit.

Preferably the biological treating systems of this invention include a plurality of biological contactor units that are mounted for reciprocating movement into and out of the wastewater to be treated. In the most preferred embodiments of this invention the biological contactor units are connected in pairs to a centrally located axle(s) that is mounted for reciprocating motion. In this arrangement each pair of contactor units moves in a teeter-totter fashion so that movement of one of the units of each pair into the wastewater results in movement of the other unit of the pair out of the wastewater. The units that are out of the wastewater are exposed to oxygen that is needed to maintain an aerobic environment of biological slimes, and these slimes, composed primarily of microorganisms, feed upon and metabolize pollutants in the wastewater.

An extremely desirable feature of this invention resides in the action created by the reciprocating motion of the biological contactor units. This enhances the interaction between the wastewater and the surfaces of the contactors to achieve effective wastewater treatment. Moreover, this reciprocating motion will tend to remove, or slough off excess growth from the surfaces of the contactors to enhance the overall performance of the system.

The arrangement of reciprocating biological contactor units in the treating systems of this invention permits construction of the units in many different forms, sizes and shapes, depending upon needs and desires of the particular system. For example, the biological contactor units can include one or more plates, and when a plurality of plates are employed, they can be maintained as a single unit by suitable supporting framework. Moreover, when the plates are employed they can be of many different sizes, shapes or configurations; the only requirement being that they be suitably connected to a reciprocating mechanism for movement into and out of the wastewater to be treated. For example, the plates can be flat, corrugated, honeycombed, or combinations thereof. In addition the plates can be aligned so that passageways between them are either generally parallel to the direction of reciprocation, or generally normal to the direction of reciprocation. In addition, individual units can be square, oblong, spherical, etc. The latitude in designing biological contactor units employed in the treating systems of this invention is considerably greater than that which exists in designing rotating biological contactor units of the type manufactured by Autotrol, and discussed earlier in this application.

In accordance with one aspect of this invention the wastewater is treated as it is continuously directed through a treating tank from an inlet to and outlet thereof. However, batch-type systems are also within the scope of this invention.

It is an object of this invention to provide simple and reliable biological treating systems.

It is a further object of this invention to provide biological treating systems for aerobically treating wastewater to remove pollutants therefrom.

It is a further object of this invention to provide biological treating systems for establishing a desirable interaction between biological contactor units thereof and the liquid to be treated.

It is a further object of this invention to provide biological treating systems in which biological contactor units are moved in a unique manner to establish a desired interaction between such units and the liquid to be treated.

It is a further object of this invention to provide biological treating systems that permit a great deal of latitude in the design and construction of biological contactor units employed therein.

Other objects and a fuller understanding of the invention will be had by referring to the following description and claims of preferred embodiments thereof, taken in conjunction with the accompanying drawings, wherein like references refer to similar parts throughout the several views.

BRIEF DESCRIPTION OF THE DRAWINGS

FIG. 1 is an isometric view of one embodiment of a biological treating system in accordance with this invention;

FIG. 2 is a horizontal sectional view taken along line 2—2 of FIG. 1 with the biological contactor units shown in phantom representation, and illustrating the path of liquid flow through the system;

FIG. 3 is an isometric view of a second embodiment of this invention;

FIG. 4 is a horizontal sectional view taken along line 4—4 of FIG. 3 with the biological contactor units shown in phantom, and illustrating the path of liquid flow through the system;

FIG. 6 is an isometric view of a third embodiment of a biological treating system in accordance with this invention; and FIG. 7 is a horizontal sectional view taken along line 7—7 of FIG. 6 with the biological contactor units shown in phantom representation, and illustrating the path of liquid flow through the system.

Figure 5:
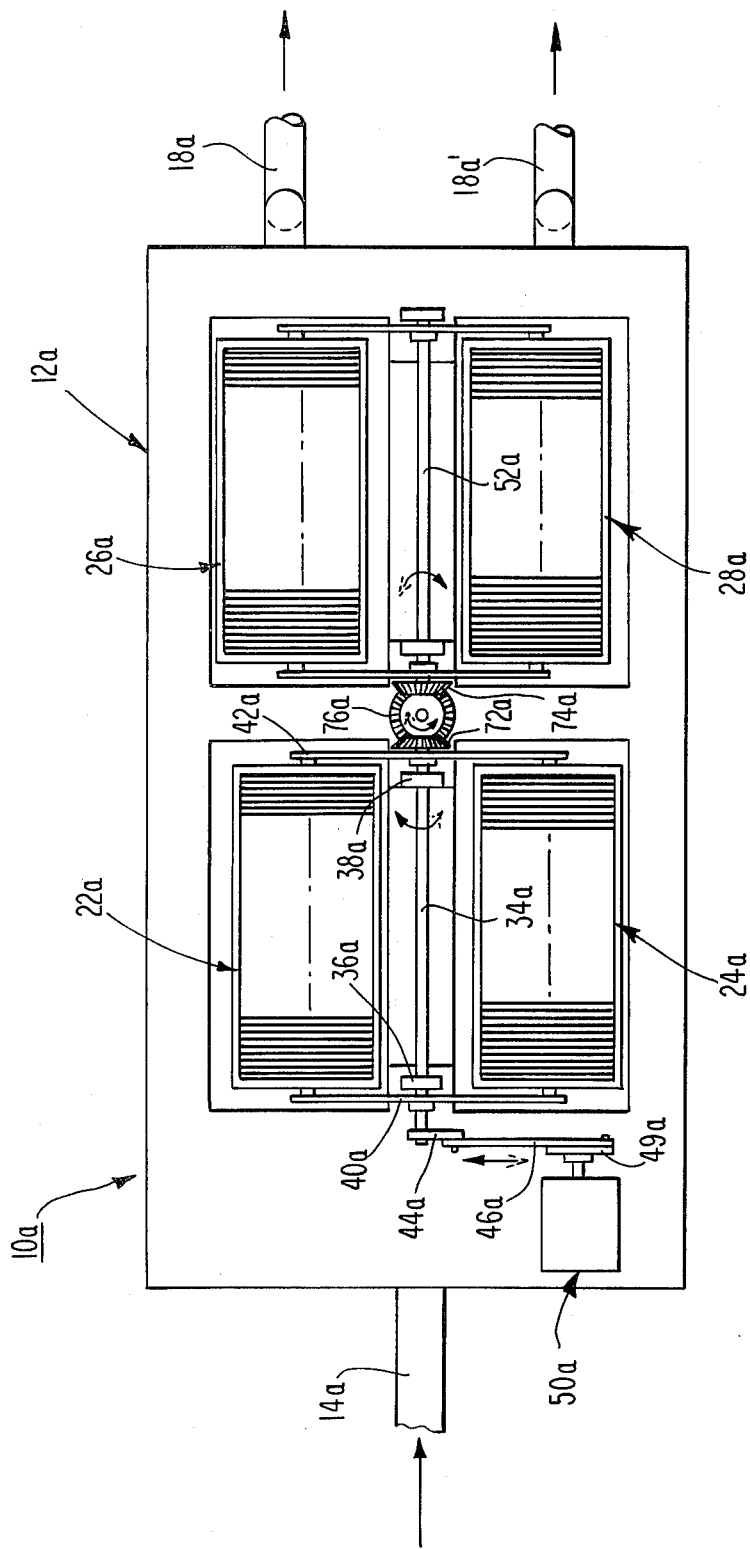
FIG. 5 is a plan view of the system shown in FIG. 3, and illustrating the drive system for the biological contactor units.

DESCRIPTION OF THE PREFERRED
EMBODIMENTS OF THE INVENTION

Although specific terms are used in the following description for the sake of clarity, these terms are intended to refer only to the particular structure of the invention selected for illustration in the drawings, and are not intended to define or limit the scope of the invention.

Referring to FIGS. 1 and 2, a first embodiment of a biological wastewater treating system is indicated at 10. This system includes a treating tank 12 having a wastewater inlet 14 extending through one end wall 16, and a wastewater outlet 18 extending through the opposed end wall 20. A plurality of biological contactor units are mounted for reciprocation within the tank 12, and in the embodiment illustrated four of such units are shown at 22, 24, 26 and 28. In this embodiment each of the contactor units is provided with a series of plates 30 retained within a supporting frame 32. Although the plates are shown as being substantially planar, they can be corrugated, alternately corrugated and flat, honeycombed, or other desired configurations and shapes as desired or needed. The important factor is designing the biological contactor units is to provide a favorable surface area to volume relationship for achieving the desired removal of pollutants from the wastewater by biological slimes that are grown on the surfaces of the units.

One of the unique and significant features of this invention resides in mounting the biological contactor units 22, 24, 26 and 28 for reciprocating motion into and out of the wastewater received within the interior of the treating tank 12. To the best of applicant's knowledge no prior art aerobic biological treating facility has employed reciprocating biological contactor units as described herein.

Referring specifically to FIG. 1, the pair of biological contactor units 22 and 24 are positioned on opposite sides of a transversely extending axle 34, and this axle is mounted for reciprocating movement within spaced-apart pillow blocks 36 and 38. Connecting rods 40 and 42 are firmly affixed to the axle 34 at approximately their midpoints to be reciprocated with the axle. The opposed ends of the connecting rods are rotatably connected to the contactor units 22 and 24 to provide the connection between the axle 34 and said contactor units. In FIG. 1 only one of these rotatable connections is shown at 39. A crank 44 is fixed to one end of the axle 34, and this crank is caused to reciprocate through the action of a lever 46 eccentrically connected at 48 to a rotatable disc 49 of a suitable power source, such as a motor 50.

As can be seen in FIG. 1 the pair of biological contactor units 26 and 28 are connected for reciprocating motion to the axle 52 in the same manner that the biological contactor units 22 and 24 are connected to axle 34. A crank 54 is fixed to the axle 52 at one of its ends, and a connecting link 56 joins the crank 54 to the crank 44 so that the motor 50, when operated, will also reciprocate the axle 52 and the biological contactor units 26 and 28 connected to said axle.

In the treating system 10 the axles 34 and 52 are generally parallel to each other and extend laterally across the tank 12; transversely to the direction of wastewater flow from the inlet 14 to the outlet 18. When the biological contactor units are being reciprocated, one of the units in each pair is submerged into the wastewater to biologically remove pollutants, and the other unit of each pair is exposed to oxygen that is needed to maintain an aerobic environment for the biological slimes. Furthermore, the drive system for reciprocating the contactor units preferably is designed to reciprocate each of the biological contactor units in a direction opposite to that of its adjacent unit in the direction of wastewater flow through the treating tank 12. The direction of fluid flow is indicated schematically by the arrows in FIG. 2.

Referring to FIGS. 3, 4 and 5, a second embodiment of a biological wastewater treatment system in accordance with this invention is shown at 10a. This system differs from the first embodiment 10 in the construction of the treating tank, in the orientation of the biological contactor units and the supporting axles, and in the drive system for reciprocating the biological contactor units.

Referring specifically to FIGS. 3 and 4, the treating tank 12a includes a wastewater inlet 14a extending through end wall 16a, and a pair of wastewater outlets 18a and 18a' extending through the opposite end wall 20a. As can be seen clearly in FIG. 4, wastewater entering the inlet 14a is received within a plenum chamber 58a, and this chamber communicates with treating sections 60a and 62a through passageways 64a, 66a in a transversely extending inner wall member 68a. As is shown in FIG. 4, the flows of wastewater through the treating sections 60a and 62a are separated from each other by a vertically extending medial wall 70a, and, as the wastewater moves through these treating sections, it is acted upon by the biological contactor units in a manner that will be explained in greater detail hereinafter. The wastewater, after being treated in the treating sections 60a and 62a, is directed out of the treating system 10a through the outlets 18a and 18a'.

Referring specifically to FIG. 3, the wastewater treating system 10a includes a plurality of biological contactor units; four of such units being shown at 22a, 24a, 26a and 28a. As illustrated, these units are identical in construction to the units 22, 24, 26 and 28 (FIG. 1), and their structures can be varied in the same manner as indicated earlier in connection with the FIG. 1 embodiment. In this embodiment one of the biological contactor units in each of the treating sections 60a and 62a is always in a submerged condition to act upon the wastewater, i.e. at no time are all of the biological contactor units in a treating section out of the tank to permit wastewater to pass through the system without being treated. In the condition illustrated in FIG. 3 the biological contactor unit 24a is submerged in the treating section 62a, and the biological contactor unit 26a is submerged in the treating section 60a.

Referring to FIGS. 3 and 5, the pair of biological contactor units 22a and 24a are mounted for reciprocating movement on opposite sides of a longitudinally extending axle 34a. This axle is mounted for reciprocating movement within spaced-apart pillow blocks 36a and 38a, and is connected to the biological contactor units 22a and 24a through connecting rods 40a and 42a in the same manner as described above in connection with the treating system 10 shown in FIG. 1. One longitudinal end of the axle 34a is connected to a crank 44a, and a lever 46a is eccentrically mounted to a rotating disc 49a of the motor 50a, and to the crank 44a, whereby rotational motion imparted to the disc 49a through the motor 50a provides the reciprocating driving force for the axle 34a and the biological contactor units 22a and 24a connected to said axle.

The drive system for reciprocating the pair of biological contactor units 26a and 28a differs from the drive system described in FIG. 1, and will be explained in connection with FIG. 5 herein. Referring to FIG. 5, the biological contactor units 26a and 28a are connected to longitudinally extending axle 52a in the same manner that the biological contactor units 22a and 24a are connected to the axle 34a. The axles 34a and 52a lie substantially along a common longitudinal axis, and the adjacent inner ends of these axles are provided with bevel gears 72a and 74a, respectively. These bevel gears mesh with a horizontal idler gear 76a mounted for rotation on a vertical shaft projecting upwardly from the top wall of the treating tank 12a. The reciprocating motion imported to the longitudinal axle 34a through the motor 50a, as explained above, is transmitted to its associated bevel gear 72a. This causes the bevel gear 74a to be driven in a direction opposite to that of the bevel gear 72a through the horizontal idler gear 76a. The directions of movement of the lever 46a and the axles 34a, 52a during one part of a reciprocating cycle is depicted by arrows in FIG. 5. As indicated in FIG. 5 the rotation of the motor shaft is simultaneously causing the biological contactor units 22a and 28a to be moved into a submerged condition within the treating sections 60a, 62a respectively. It should be understood that the drive system shown herein is illustrative of one type that can be employed to achieve the desired reciprocating action of the biological contactor units. However, if desired, other drive systems can be employed.

Referring to FIGS. 6 and 7, a third embodiment of a biological wastewater treatment system is shown at 10b. In this system biological contactor units 22b, 24b, 26b and 28b are oriented, mounted and reciprocated in the identical manner described earlier in connection with the treating system 10a illustrated in FIGS. 3 through 5. However, the system 10b has a distinction relative to the system 10a in that it is designed to permit greater exposure of the wastewater to the biological action of the contactors without increasing the overall size of the treating system. This is accomplished by constructing the treating tank 12b in the manner shown in FIG. 7, with the wastewater inlet 14b and the wastewater outlet 18b provided through the same end wall of the tank.

As can be seen by comparing FIGS. 4 and 7, the structure of the treating tank 12a is very similar to the structure of the treating tank 12b. Specifically, the tank 12b differs from the tank 12a by omitting a wastewater inlet to the plenum chamber 58b, and by converting one of the wastewater outlets (e.g. 18a) to a wastewater inlet 14b. As a result of these changes the wastewater will pass into the wastewater treating section 60b through the wastewater inlet 14b, and then serially through passageway 64b, plenum chamber 58b, passageway 66b, treating section 62b and through the wastewater outlet 18b. In other words, the same wastewater passes through both of the treating sections 60b and 62b as it moves from the inlet 14b to the outlet 18b.

It should be apparent that the tank 12a shown in FIG. 4 could be converted for use in the identical manner as the tank 12b shown in FIG. 7 by merely plugging the wastewater inlet 14a with a suitable stopper or plug, and by employing one of the wastewater outlets as the wastewater inlet.

Note that in the treating system 10b (FIG. 7) wastewater directed through the treating tank 12b will always be exposed to the action of at least two submerged biological contactor units (e.g. 24b and 26b in the condition of the treating system shown in FIG. 6). This is the result of doubling the flow path for the wastewater, as compared to the length of the flow path achieved in the treating system 10a.

The reciprocating arrangement of biological contactor units in accordance with this invention can be utilized in many different wastewater treatment systems. For example, it can be utilized in secondary treatment systems to remove biodegradeable pollutants in municipal or industrial wastewater received from a primary clarifier; or other primary treatment system. After this secondary treatment, the wastewater can be discharged to a final clarifying operation or directly to surface waters; depending on the condition of the wastewater. This secondary treatment preferably is carried out by continuously moving the wastewater from and inlet to an outlet of the system as it is being acted upon by the reciprocating contactor units. However, as indicated earlier, it is within the scope of this invention to employ this invention in a batch-type operation.

If desired, the reciprocating arrangement can be used to upgrade primary treatment systems, activated sludge plants, trickling filter plants and other systems or plants where the aerobic treatment of liquids is desired.

Several modifications and variations are considered to be within the scope of this invention. For example, although the various embodiments are depicted as including four biological contactor units, the number of such units is a matter of choice and will be dictated by such factors as the volume of wastewater to be treated, the condition of the wastewater and the type of treatment facility in which the biological treatment system is intended to be used. Moreover, the number of units can be increased by either extending the lengths or widths of the various treating tanks to accommodate them. In addition, the size of the individual biological contactor units can be varied within wide limits. Thus, for a given size treating tank, the number of biological contactor units can be varied by merely varying their size. In fact, for many applications it may be desirable to increase the number of biological contactor units so that any malfunction of a particular set of reciprocating members will permit removal of that set from service without excessively detracting from the treating capabilities of the system.

Although the invention has been described with a certain degree of particularity, it is understood that the present disclosure has been made only by way of example and that numerous changes in the details of construction and in the combination and arrangement of parts may be resorted to without departing from the scope of the invention.

What is claimed is:

1. An aerobic biological treating system for wastewater, said system including:

a treating tank for wastewater having inlet means for receiving wastewater to be aerobically treated and outlet means for receiving the aerobically treated wastewater;

at least two pairs of wastewater contacting units, said units including surfaces for encouraging the growth of biological slimes thereon;

first connecting means joining one pair of units together for reciprocating motion to permit each unit of said one pair to alternately move into and out of the wastewater;

second connecting means joining a second pair of units together for reciprocating motion to permit each unit of the second pair to alternately move into and out of the wastewater; and drive means for reciprocating the first and second connecting means to alternately move each unit of each pair into and out of the wastewater as said wastewater is being directed through the tank from said inlet means to said outlet means.

2. The system of claim 1 wherein said wastewater, as it moves from said inlet means to said outlet means, sequentially passes adjacent contacting units that, during reciprocation, move in opposite directions relative to each other.

3. The system of claim 1 wherein said treating tank includes internal wall means for separating said tank into a first treating section and a second treating section for guiding the flow of wastewater through said first and second sections and then through said outlet means, one contacting unit of said one and second pair of units being moveable into and out of the first treating section, and the other contacting unit of said one and a second pair of units being moveable into and out of the second treating section.

4. The system of claim 3 wherein said inlet means is adjacent one axial end of said treating tank and communicate with a plenum chamber in the interior of said plenum chamber communicating with said first and second treating sections, said outlet means including an outlet conduit in communication with each of said treating sections adjacent the end of the treating tank opposed to said inlet means.

5. The system of claim 3 wherein said inlet means communicates with one of said treating sections and said outlet means communicates with the other of said treating sections adjacent the same end of said treating tank, the opposite end of said treating tank including a plenum chamber that communicates the two treating sections, whereby said wastewater flows serially into said inlet means, through said one treating section, through said plenum chamber, through said other treating section and through said outlet means.

6. The system of claim 3 wherein adjacent contacting units that are movable into the same treating section, during reciprocation, move in opposite directions relative to each other.

7. The system of claim 3 wherein the first and second connecting means lie substantially along a common longitudinal axis, said drive means reciprocating said first and second connecting means in opposite directions.

8. The system of claim 1 wherein the first and second connecting means lie substantially along a common longitudinal axis, said drive means reciprocating said first and second connecting means in opposite directions.

9. The system of claim 8 wherein the contacting units on one side of the common longitudinal axis are alternately movable into and out of a first treating section of the treating tank and the contacting units on the opposite side of the common longitudinal axis are alternately movable into and out of a second treating section of said tank, including wall means for guiding the flow of wastewater through said first and second sections and then through said outlet means.

10. The system of claim 9 wherein said inlet means is adjacent one axial end of said treating tank and communicates with a plenum chamber in the interior of said tank, said plenum chamber communicating with said first and second treating sections, said outlet means including an outlet conduit in communication with each of said treating sections adjacent the end of the treating tank opposed to said inlet means.

11. The system of claim 9 wherein said inlet means communicates with one of said treating sections and said outlet means communicates with the other of said treating sections adjacent the same end of said treating tank, the opposite end of said treating tank including a plenum chamber that communicates the two treating sections, whereby said wastewater flows serially into said inlet means, through said one treating section, through said plenum chamber, through said other treating section and through said outlet means.

12. The system of claim 1 wherein the first and second connecting means are separate axles that are generally parallel to each other, and that are spaced from each other along the treating tank.

13. The system of claim 12 wherein, during reciprocating motion of the contacting units, each unit moves in a direction opposite to that of its adjacent unit in the direction of wastewater flow from said inlet means to said outlet means.

14. The system of claim 1 wherein the drive means reciprocates the first and second connecting means without completely removing any of the units from the wastewater to eliminate the need for overcoming surface tension effects as the units are being reciprocated.

15. The system of claim 1 wherein the first and second connecting means include axles located between their respective pairs of contacting units and means pivotally connecting said axles to said contacting means.

* * * * *